United States Patent [19]

Kammer

[11] Patent Number: 5,298,535
[45] Date of Patent: Mar. 29, 1994

[54] PIGMENT COMPOSITIONS FOR SOLVENT AND WATER-BASED INK SYSTEMS AND THE METHODS FOR PRODUCING THEM

[75] Inventor: Joseph Kammer, Warwick, R.I.

[73] Assignee: Hoechst Celanese Corporation, Somerville, N.J.

[21] Appl. No.: 956,149

[22] Filed: Oct. 5, 1992

[51] Int. Cl.$^5$ .................................................. C08K 5/23
[52] U.S. Cl. ........................................ 524/190; 523/160
[58] Field of Search ................ 523/160, 161; 524/190

[56] References Cited

FOREIGN PATENT DOCUMENTS

| 0083809 | 7/1978 | Japan | 524/190 |
| 0041276 | 2/1987 | Japan | 523/161 |
| 0077977 | 4/1988 | Japan | 524/190 |

*Primary Examiner*—Paul R. Michl
*Assistant Examiner*—Peter Szekely
*Attorney, Agent, or Firm*—Hugh C. Crall

[57] ABSTRACT

This invention is an azo pigment composition containing a water insoluble metal salt of a water soluble polymer; a method of preparing said composition and ink compositions prepared from said azo pigment compositions.

24 Claims, No Drawings

PIGMENT COMPOSITIONS FOR SOLVENT AND WATER-BASED INK SYSTEMS AND THE METHODS FOR PRODUCING THEM

BACKGROUND OF THE INVENTION

1. Technical Field

This invention is that of improved organic azo pigment compositions and processes for their preparation. The compositions of the invention have superior application properties including high gloss, improved transparency, high tinctorial strength and improved shade.

2. Background

Organic pigments are well known in the field of colorants. They are used in the coloring of printing inks, paints and plastics to impart a desired color in these articles. In addition, they find application to impart color to numerous other articles such as cosmetics, paper, leather, textile products etc.

An important class of organic pigments are the monoazo and disazo compounds derived from the coupling of compounds selected from the betanaphthols, the arylides, and the pyrazolones with a diazonium salt or a bisdiazonium salt of a substituted or unsubstituted aromatic amine or diamine. The preparation of such azo pigments is well known. An aromatic amine is typically diazotized in a strongly acidic aqueous medium with nitrous acid to form a diazotized derivative. The diazotized derivative is further reacted with a second molecule, a coupling component, to form the azo pigment. Numerous patents are available which describe the preparation of monoazo and disazo organic pigments; see e.g. U.S. Pat. Nos. 2,431,889; 3,617,171; 3,759,731; 3,775,148; 3,776,749; 4,341,701 and 4,968,352, the teachings of which are hereby incorporated by reference.

In addition to the chemical structure, the physical form of the pigment greatly influences its properties. Process conditions are controlled in the manufacturing process to influence such properties as crystalline form, particle size and particle size distribution to effect optimum dispersibility, tinctorial strength, gloss, transparency, shade and other properties.

It is also known in the art to add surface active agents, rosins and resins to the coupling reaction or after coupling to effect improved properties; see e.g. U.S. Pat. No. 4,968,352, Col. 7. It is the object of this invention to produce improved pigment compositions having superior properties by finishing the pigment composition in the presence of an insoluble metal salt of water or aqueous alkali soluble resin. The pigment compositions of this invention exhibit unexpectedly superior application properties in ink systems; e.g. improved gloss, transparency, tinctorial strength, brightness and dispersion stability.

SUMMARY OF THE INVENTION

This invention is directed to new azo pigment compositions methods of preparing such compositions and inks prepared from such compositions. The pigment compositions of this invention are prepared by forming a suspension of an azo pigment in an aqueous medium containing a water or aqueous base soluble resin; e.g. a styrene/acrylic acid resin, a polyacrylic acid resin or a methacrylic acid polymer. The resin is dissolved in the aqueous pigment dispersion and the pigment is finished by precipitating the resin by adding an insolubilizing metal, i.e. a metal atom which renders the resin insoluble. The metal can be in the form of a salt of a Group IIA, IIIA, or IIIB of the Periodic Table and manganese; e.g. Mg, Ca, Sr, Ba, Ti, Zr, Mn, Al and mixtures thereof; the Ca and Sr salts are preferred. The compositions of the invention may be prepared by conducting the pigment coupling reaction in the presence of about 5 to 35 percent by weight of water or aqueous base soluble resin, e.g. a styrene/acrylic or a polyacrylic resin preferably about 7 to 15 percent by weight based upon the weight of pigment formed in the coupling. The resin is then preferably precipitated by the addition of a Group IIA, IIIA, or IIIB water soluble metal salts. The resulting pigments exhibit unexpectedly superior improved application properties, i.e. increased transparency, increased gloss and 10 to 40% higher tinctorial strength in water based ink systems and in solvent ink systems. In addition the pigment compositions of the invention exhibit improved dispersion stability in solvent based inks.

DESCRIPTION OF THE PREFERRED EMBODIMENTS

The invention is directed to improved pigment compositions of the monoazo and disazo series and printing inks prepared from said pigment compositions and articles colored or printed with such pigments.

The compositions of this invention comprise azo organic pigments containing from about 5 to about 35 percent by weight, preferably about 7 to 15 percent by weight of the insoluble metal salt of a water soluble resin.

The diazotization and coupling of the amines and coupler used in the preparation of pigments are conducted in the normal manner. The resin or its water soluble salt may be incorporated into the azo pigment composition of the invention in a number of ways; e.g.:

(a) prior to coupling by dissolving it in the coupler solution;

(b) by adding it to the coupling reaction during the addition of the coupler to the diazonium or bisdiazonium component (c) by adding it to the reaction mixture after addition of the coupler Other additives normally used in azo pigment manufacture may be incorporated into the azo pigment composition of this invention; e.g. amines, extenders, surfactants. The process may be carried out in the presence of a carrier material, for example barite. In addition, after coupling the reaction mixture may be heat treated; the moist presscake or dried powder may also be subjected to thermal after treatment and if appropriate in the presence of an organic solvent. The pigments of the invention are washed, dried and ground in the usual manner, optionally with the addition of grinding auxiliaries.

The monoazo and disazo pigments to which the invention is directed may be represented by the following formulae:

Monoazo Pigment $A-N=N-B$; and

Disazo Pigment $A-N=N-D-N=N-A$

The moiety, A may be derived from a substituted or unsubstituted arylide, a substituted or unsubstituted pryazolone or substituted or unsubstituted naphthol; preferably A is derived from a naphthol. B is a substituted or unsubstituted phenyl or naphthol group and C is a substituted or unsubstituted diphenylene or bis phenylene group.

The moiety, A may be an arylide of the general formulae:

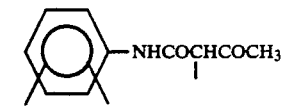

or

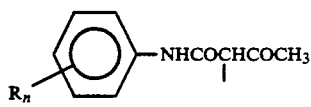

wherein: n is an integer equal to 1 to 3; R is hydrogen, an alkyl of one to four carbons, an alkoxy of one to four carbons, halogen (Cl, Br, I, F), —NO$_2$, —SO$_3$X wherein X is hydrogen, sodium, calcium, strontium, barium, magnesium, aluminum and manganese; —CONH Y wherein Y is hydrogen or a substituted or unsubstituted phenyl wherein said substituent is an alkyl of one to four carbons, an alkoxy of one to four carbons, halogen and —SO$_3$X or —COOX wherein X is defined above or —CONH$_2$.

The moiety, A may also be a substituted or unsubstituted pryazolone of the formula:

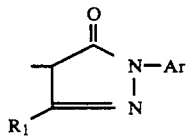

wherein Ar is a substituted or unsubstituted phenyl wherein said substituent is alkyl of one to four carbons or —SO$_3$X. R$^1$ is —COOX$_1$ wherein X$_1$ is hydrogen or an alkyl of one to four carbons or R$^1$ is hydrogen or alkyl of one to four carbon.

A, may also be a naphthol of the formula:

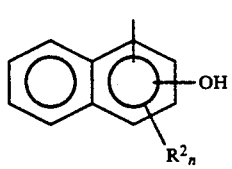

wherein R$^2$ is hydrogen, alkyl of 1 to 4 carbons, alkoxyl of 1 to 4 carbons, —COOX where X is defined above; —SO$_3$X wherein X is defined above, —NO$_2$, halogen and —CONHR$^3$ wherein R$^3$ is hydrogen, phenyl or substituted phenyl wherein said phenyl substituent is R$_n$ wherein R and n are defined above. The substituent R$^2$ may be located on either ring of the naphthol moiety or on both when n is greater than 1.

B is represented by the formula:

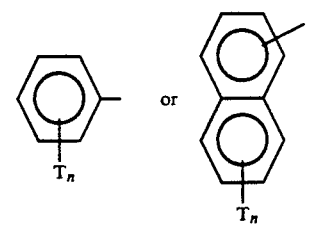

wherein T is R as defined above and n is 1 to 3. T may also be:

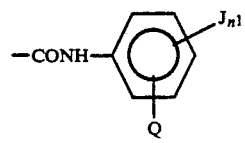

wherein J is alkyl or alkoxyl of 1 to 4 carbons or hydrogen and n$^1$ is 1 or 2. Q is —CONH$_2$ or —CONH—Ar—J; wherein J and Ar are defined above.

D is represented by the formula:

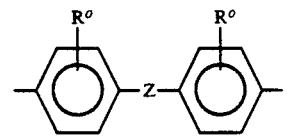

wherein Z is bond or —CONH—, and R$^o$ is hydrogen, halogen, alkyl or alkoxy of 1 to 4 carbon.

Exemplary examples of coupling components within the above described formulae are:
When A is derived from an arylide:
Acetoacetylamino-benzene,
2-acetoacetylamino-toluene,
4-acetoacetylamino-toluene,
2-acetoacetylamino-anisol,
4-acetoacetylamino-anisol,
2-acetoacetylamino-phenetitide,
4-acetoacetylaminophenetitide,
1-acetoacetylamino-2,4-dimethylbenzene,
1-acetoacetylamino-2,4-dimethoxybenzene,
1-acetoacetylamino-2,5-dimethoxybenzene,
1-acetoacetylamino-2,4-dichlorobenzene,
1-acetoacetylamino-2,5-dimethoxy-4-chlorobenzene,
5-chloro-2-acetoacetylamino-toluene
3-chloro-4-acetoacetylamino-toluene,
1-acetoacetylamino-naphthalene,
2-acetoacetylamino-naphthalene.
When A is derived from a naphthol:
2-naphthol,
3-hydroxy-2-naphthanilide,
4'-acetamido-3-hydroxy-2-naphthanilide,
3-hydroxy-3'-nitro-2-naphthanilide,
2'-ethoxy-3-hydroxy-2-naphthanilide,
2'-methoxy-3-hydroxy-2-naphthanilide,
3'-nitro-3-hydroxy-2-naphthanilide,
3-hydroxy-2-naphtho-o-toluidide,
2'-methyl-5'-chloro-3-hydroxy-2-naphthanilide,
2'-methyl-3-hydroxy-2-naphthanilide,
3-hydroxy-N-2-naphthyl-2-naphthamide, and
4'-chloro-3-hydroxy-2-naphthanilide.
When A is derived from a pyrazolone:

3-methyl-1-phenyl-pyrazolone-(5),
3-methyl-1-(3'-sulfophenyl)-pyrazolone-(5),
3-methyl-1-(4'-sulfophenyl)-pyrazolone-(5),
3-carbethoxy-1-phenyl-pyrazoline-(5),
3-methyl-1-(4'-carboxyphenyl)-pyrazolone-(5),
3-methyl-1-(2'-chloro-4'-sulfophenyl)-pyrazolone-(5),
3-methyl-1-(2',5'-dichloro-4'-sulfophenyl)-pyrazolone-(5),
3-methyl-1-(6'-chloro-2'-methyl-4'-sulfophenyl)-pyrazolone-(5),
1-phenyl-3-carboxy-pyrazolone-(5), and
1-(4'-sulfophenyl)-3-carboxy-pyrazolone-(5),
3-methyl-1-p-tolyl-pyrazolone-(5).

Exemplary amines and diamines useful in the invention are:
2,5-dichloroaniline
2,4-dinitroaniline
2-nitro-4-methylaniline
3,3'-dichlorobenzidine
3,3'-dimethoxybenzidine
3-amino-4-chlorobenzamide
2-methoxy-5-nitro-aniline
5-aminoisophthalic acid dimethyl ester
2-aminobenzoic acid
2-trifluoromethylaniline
3-amino-4-methoxybenzanilide Exemplary pigments useful in the invention are:

Cl Pigment Orange 5 diazotized 2,4-dinitroaniline coupled with 2-naphthol

Cl Pigment Orange 6 diazotized 2-nitro-4-methylaniline coupled with 3-methyl-1-phenyl-5-pyrazolone

Cl Pigment Orange 38 diazotized 3-amino-4-chlorobenzamide coupled with 4-acetamido-3-hydroxy-2-naphthanilide Cl Pigment Orange 13 bisdiazotized 3,3'-dichlorobenzidine coupled with 3-methyl-1-phenyl-5-pyrazolone (2 moles)

Cl Pigment Orange 34 bisdiazotized 3,3'-dichlorobenzidine coupled with 3-methyl-1-p-tolyl-5-pyrazolone (2 moles)

Cl Pigment Yellow 12 bisdiazotized 3,3'-dichlorobenzidine coupled with acetoacetanilide (2 moles)

Cl Pigment Yellow 13 bisdiazotized 3,3'-dichlorobenzidine coupled with acetoacet-m-xylidide (2 moles)

Cl Pigment Yellow 14 bisdiazotized 3,3'-dichlorobenzidine coupled with acetoacet-o-toluidide (2 moles)

Cl Pigment Yellow 17 bisdiazotized 3,3'-dichlorobenzidine coupled with acetoacet-o-anisidide (2 moles)

Cl Pigment Yellow 74 diazotized 2-methoxy-4-nitroaniline coupled with acetoacet-o-anisidide

Cl Pigment Yellow 120 diazotized 5-aminoisophthalic acid dimethyl ester coupled with N-(2-oxo-5-benzimidazolinyl) acetoacetamide Cl Pigment Yellow 151 diazotized 2-aminobenzoic acid coupled with an acetoacetyl derivative of 5-aminobenzimidazolone Cl Pigment Red 2 diazotized 2,5-dichloroaniline coupled with Naphtol AS, (3-hydroxy-2-naphthanilide)

Cl Pigment Red 22 diazotized 2-methyl-5-nitroaniline coupled with Naphtol AS, (3-hydroxy-2-naphthanilide)

Cl Pigment Red 23 diazotized 5-nitro-o-anisidine coupled with 3-hydroxy-3'-nitro-2-naphthanilide

Cl Pigment Red 38 bisdiazotized 3,3'-dichlorobenzidine coupled with 3-carbethoxy-1-phenyl-5-pyrazolone (2 moles)

Cl Pigment Red 146 diazotized anisbase, (3-amino-4-methoxybenzanilide) coupled with 4'-chloro-3-hydroxy-2,5'-dimethoxy-2-naphthanilide.

Cl Pigment Red 147 diazotized anisbase (3-amino-4-methoxybenzanilide) coupled with 2-methyl-5-chloro-3-hydroxy-2-naphthanilide.

The water soluble resins useful in this invention are polymeric compounds having sufficient acid groups to render them water soluble or base soluble. The acid number of such compounds should be at least about 50. Generally the acid number will be between 50 and 300, preferably 100 to 200. Examples of such materials are the polymers of acrylic acid, methacrylic acid, maleic acid, maleic anhydride and copolymers of such acid with themselves and other copolymerizable monomers having ethylenic unsaturation. Such unsaturated monomers include, for example, other monocarboxylic acids, polycarboxylic acids and anhydrides, substituted and unsubstituted esters and amides of carboxylic acids and anhydrides, nitriles, vinyl monomers, vinylidene monomers, mono-olefinic and poly-olefinic monomers. Representative products include Luekotan polymers (methacrylic acid copolymers available from Rohm & Haas, Philadelphia, Pa.), the Joncryl resins (styrene/acrylic acid copolymers available from Johnson Wax, Racine, Wis.), the Morez resins (styrene/acrylic acid copolymers from Morton International, Chicago, Ill.) the Sokalan polymers (polyacrylic acid and maleic acid/olefin copolymers available from BASF Corporation, Parsipanny, N.J.) and the Vancryl resins (styrene/acrylic acid, copolymers available from Air Products, Allentown, Pa.). These water soluble polymers may be used in their free acid form or the water soluble salts thereof. The term "water soluble polymer" as used in this description is intended to include those polymer soluble in water and those soluble in aqueous alkaline solution. Preferred water soluble polymers are the styrene/acrylic acid and maleic/olefinic copolymers. Exemplary bases useful to enhance the solubility of such polymers are the alkali metals (Li, Na, K, etc.) and ammonium hydroxide. These polymers may be used in an amount from about 5% to 35% by weight based on the weight of the pigment formed in the coupling reaction; preferably about 8% to about 20% and more preferably about 7 to 15%. The water soluble polymers useful in this invention must form an insoluble salt when reacted with a metal from Group IIA, IIIA or IIIB of the Periodic Table such as calcium or strontium.

Representative comonomers include, for example, itaconic acid, citraconic acid, aconitic acid, fumaric acid, crotonic acid, cinnamic acid, oleic acid, palmitic acid, esters of such acids, the alkyl or cycloalkyl groups having 1 to 18 carbon atoms such as, for example, ethyl, butyl, 2-ethylhexyl, octadecyl, 2-sulfoethyl, acetoxyethyl, cyanoethyl, hydroxyethyl and hydroxypropyl acrylates and methacrylates, and amides of the foregoing acids, such as, for example, acrylamide methacrylamide, methylolacrylamide, and 1,1-dimethylisulfoethylacrylamide, acrylonitrile, methacrylonitrile, styrene, methystyrene, p-hydroxystyrene, chlorostyrene, sulfostyrene, vinyl alcohol, N-vinyl pyrrolidone, vinyl acetate, vinyl chloride, vinyl ethers, vinyl sulfides, vinyl toluene, butadiene, isoprene, chloroprene, ethylene, isobytylene, vinylidene chloride, sulfated castor oil, sulfated sperm oil, sulfated soybean oil, and sulfonated dehydrated castor oil.

The application properties of the pigments evaluated in this description were conducted in a water based flexo ink and in a solvent based ink. The water based test ink was prepared by dispersing the pigment in a water based binder solution containing 52.3% water, 10% isopropanol, 7.7% ammonia 28% and 30% of a styrene-acrylic acid copolymer (Joncryl 67 Resin). The dispersion consisted of 15 parts pigment: 45 parts water: 40 parts of binder solution.

The transparency and gloss properties were conducted on an ink prepared from the above dispersion diluted to a 10% pigment content with additional binder solution (2 parts dispersion: 1 part of binder solution). Drawdowns of the 10% pigment content ink were made on coated stock using a #4 wire wound applicator.

Tinctorial strength was measured on drawdowns of one part of the above described dispersion (15% pigment content) dispersed in 10 parts a titanium dioxide dispersion—(40 parts water based binder solution: 20 parts of water: 40 parts of titanium dioxide using a #4 wire wound applicator. The tinctorial strength results were read using an ACS Chroma Sensor CS5 color spectrophotometer with a computer assisted software package Chroma QC available from ACS DATA-COLOR, Princeton, N.J. Gloss reading were determined at 60° angle of reflection using a BYK-Gardner "Pocketgloss" gloss-meter available from BYK-Gardner, a subsidiary of BYK Chemie, U.S., Englewood, N.J. or were visually evaluated and rated under industry standardized lighting conditions as is described below.

A ¼" SS nitrocellulose ink test was used to evaluate the pigment compositions of this invention in a solvent based ink system. The pigments were ground and formulated into a solvent based ink as follows. A millbase of 85 parts of an ink vehicle composed of ethanol, ethyl acetate, dibutyl phthalate, one-quarter second SS nitrocellulose and 15 parts of pigment are placed in a glass jar containing zircoa beads. The mixture is then dispersed on a paint shaker for one hour. This millbase is then adjusted to 10 percent pigment content with ink vehicle for drawdown on foil and coated stock using a #4 Meier Rod. These drawdowns are used to evaluate gloss, transparency and print tone (full tone) shade.

Pigment strength in the solvent based ink system were determined on a composition consisting of 1 part millbase and 10 parts of a titanium dioxide dispersion in ink vehicle; (40 parts $TiO_2$: 60 parts ink vehicle). Except as noted above, strength and gloss were measured as described for the flexo water based ink. Drawdown are evaluated visually under industry standardized lighting conditions and perceived differences in transparency and color characteristics as compared with control as a standard are expressed as numbers between 5+ and 5− by the following designations:

5+ much more
4+ considerably more
3+ distinctly more
2+ slightly more
1+ trace more
− equal
1− trace less
2− slightly less
3− distinctly less
4− considerably less
5− much less The following examples illustrate the invention but should not be construed to limit its scope and are merely intended as illustrations of the present invention.

EXAMPLE 1

CI Pigment Red 2

Preparation of Diazo Solution 18.2 parts of 2,5-dichloroaniline (100%), 37.2 parts of 37% hydrochloric acid and 20.5 parts of water were stirred for one hour. 130 parts of water was added and ice was added to cool the solution to 0° to −5° C. 19.1 parts of sodium nitrite, 40% solution, was then added subsurface. The temperature was maintained at less than 10° C. while maintaining a positive nitrite test for one hour. Sulfamic acid was added to destroy excess nitrite. 5.8 parts of acetic acid were added. One part of filter aid was added and the solution filtered. Nonionic surfactants in the amount of 3 parts were added to the solution and its volume was adjusted to 600 ml with water.

Preparation of Coupler Solution

A solution was made by mixing 30.3 parts of Naphthol AS, (3-hydroxy-2-naphthanilide), 5 parts of a styrene/acrylic acid copolymer (Morez 200 available from Morton International, Chicago, Ill. 60606-1292), 21 parts of a 50% sodium hydroxide solution. 550 parts of water and one part of filter aid were added to the Naphthol AS solution and it was filtered. The volume was then adjusted to 950 ml with water.

Coupling Reaction

The Naphthol AS coupler solution was added to the diazotized 2,5 dichloraniline solution with stirring over a period of several hours while maintaining the reaction temperature at 35° to 40° C. After coupler addition was completed, the pH of the reaction mixture is adjusted to 4.0 to 4.5 with sodium acetate.

Finishing Step

The coupled reaction mixture was heated to 90° C. with stirring and held for 30 minutes. The mixture was cooled, filtered and the pigment was washed with water, dried and ground.

The pigment was tested in water flexo ink and in solvent based ¼" SS nitrocellulose (¼" SS N/C) inks against a commercial product. The test results follow. This example does not utilize the invention.

| Test | Water Flexo Ink | Solvent |
| --- | --- | --- |
| Transparency | 4+ | 4− |
| Gloss | 5+ | 4− |
| Strength | 110% | 78% |
| Brightness | 4+ | 3− |

EXAMPLE 2

Cl Pigment Red 2

A Cl Pigment Red 2 was prepared substantially in accordance with the procedure of Example 1 except the Finishing Step was modified as follows:

Finishing Step

The pH of the coupled reaction mixture was adjusted to 8-9 with 28 parts of a 15% sodium hydroxide solution and stirred for 20 minutes at 40° C. A solution of 4 parts of calcium chloride dihydrate dissolved in 50 parts of water was then added to the reaction mixture chloride dihyddrate dissolved in 50 parts of water was then added to the reaction mixture over a period of 10 minutes and mixing was continued after completion of the addition for another 20 minutes.

The coupled reaction mixture was heated to 90° C. with stirring and held for 30 minutes. The mixture was cooled, filtered and the pigment was washed with water, dried and ground.

The pigment was tested in water flexo ink and in ¼" SS nitrocellulose (¼" SS N/C) systems on coated stock against the same commercial product of Example 1. The test results follow. This example utilizes the invention.

| Test | Water Flexo Ink | ¼ SS N/C Ink Solvent |
| --- | --- | --- |
| Transparency | 5+ | 3+ |
| Gloss | 5+ | 3+ |
| Strength | 118% | 95% |
| Brightness | 4+ | — |

EXAMPLE 3

Cl Pigment Red 2

A Cl Pigment Red 2 was prepared substantially in accordance with the procedure set forth in Example 2 except the styrene/acrylic acid copolymer was Vancryl 68 available from Air Products and Chemicals of Allentown, Pa.

The pigment was tested in water flexo ink and compared against the same commercial product of Example 1. The test was conducted on coated stock.

| Test | Water Flexo Ink |
| --- | --- |
| Transparency | 5+ |
| Gloss | 5+ |
| Strength | 110% |
| Brightness | 3+ |

EXAMPLE 4

Cl Pigment Red 2

A Cl Pigment Red 2 was prepared substantially in accordance with Example 3 except the Finishing Step was modified as follows.

Finishing Step

The pH of the coupled reaction mixture was adjusted to 8-9 with 28 parts of 15% sodium hydroxide and stirred for 20 minutes at 40° C. A solution of 0.7 parts of calcium chloride dihydrate and 0.8 parts of strontium nitrate in 50 parts of water was then added over 10 minutes and stirring was continued for another 20 minutes. This mixture was then heated to 90° C. and maintained at 90° C. with stirring for an additional 30 minutes. The mixture was cooled, filtered and the pigment was washed with water, dried and ground. The pigment was tested in water flexo ink on coated stock against the same commercial product of Example 1. The test results follow.

| Test | Water Flexo Ink |
| --- | --- |
| Transparency | 5+ |
| Gloss | 5+ |
| Strength | 111% |
| Brightness | 3+ |

EXAMPLE 5

Example 1 was repeated using Vancryl 68; styrene acrylic acid resin.

The pigment was tested in a water flexo ink on coated stock against the same commercial product of Example 1. The test results follow.

| Test | Water Flexo Ink |
| --- | --- |
| Transparency | 3− |
| Gloss | 2+ |
| Strength | 96% |
| Brightness | 3+ |

EXAMPLE 6

Cl Pigment Red 2

163.8 parts of 2,5-dichloroaniline (100%) are mixed with 334.8 parts of 37% hydrochloric acid and 184.8 ml of water for two hours. The slurry is diluted and cooled to 0° C. to −5° C. with 1000 parts of water and ice and then 174.5 parts of sodium nitrite solution (40%) are added subsurface. A slight excess nitrite concentration is maintained at a temperature of less than 10° C. for one hour. The excess nitrite is destroyed with sulfamic acid and 52.2 parts of glacial acetic acid and 9 parts of filter aid is added. The solution is filtered and the volume is adjusted to 6000 ml. 62.1 parts of nonionic surfactants and 10 parts of methylarylamide in 150 parts of water are added to the clarified diazo solution to which is added a clarified solution of 272.2 parts of Naphthol AS (3-hydroxy-2-naphthanilide) and 45 parts of a aqueous base soluble styrene-acrylic acid copolymer, (Joncryl 67 from Johnson Wax of Racine, Wis.) resin and 180 parts of sodium hydroxide (50%) in 8500 parts of water over 2 hours. The temperature is maintained at 35°–40° C. Thereafter the solution is heated to 40° C. and sodium acetate is added to adjust the pH to 4.3–4.5.

The coupled reaction mixture was finished in two portions.

Finish 1

The pH of one half of the reaction mixture was adjusted to 8 to 9 with sodium hydroxide and mixed for ½ hour. A solution of calcium chloride dihydrate (36 parts) in water (300 parts) was added over 10–15 minutes and mixing was continued for ½ hour. The reaction mixture was heated to 90° C. and held at 90° C. for one hour. The mixture was then cooled, filtered, and washed with water, dried and ground.

Finish 2

One part was heated to 90° C. and stirred for 30 minutes then cooled, filtered, washed, dried and pulverized.

The pigments were tested against the same commercial product of Example 1 and gave the following results:

| Test | Water Flexo Ink | Solvent Ink |
|---|---|---|
| Finish 1 | | |
| Transparency | 5+ | 3+ |
| Gloss | 5+ | 3+ |
| Strength | 109% | 95% |
| Brightness | 5+ | 3+ |
| Finish 2 | | |
| Transparency | 2+ | 5− |
| Gloss | 5+ | 5− |
| Shade | 5 (yellow) | 3 (blue) |
| Strength | 100% | 70% |
| Brightness | 3+ | 5− |

EXAMPLE 7

Cl Pigment Yellow 83

Ci Pigment Yellow 83 was prepared by slurrying 25.3 parts of 3,3' dichlorobenzidine in 188 parts of water and 34 parts of hydrochloric acid (31%). The mixture was stirred for 2 hours and cooled to 0° to −5° C. with ice. Then 33.8 parts of sodium nitrite, 40% aqueous solution, is added rapidly subsurface. A strong positive nitrite test and a temperature of less than 10° C. are maintained for 1.0 hour. The nitrite is then destroyed by the addition of sulfamic acid, the reaction mixture is clarified by filtering and its volume adjusted to 550 ml with water.

A solution of 57.2 parts of Naphthol AS-IRG (4-chloro-2,5'-dimethoxy acetoacetanilide) (100%) in 205 parts of water and 20.3 parts of sodium hydroxide solution (50%) is made. This solution is filtered. A solution of 215 parts water, 1.0 part nonionic surfactant, 6.7 parts of hydrochloric acid (37%) and 14.5 parts of acetic acid is added to the coupler solution and the pH is adjusted to about 5.5 to 5.7 and 12.9 parts of nonionic surfactant are added.

The diazotized 3,3' dichlorobenzidene was added to the Naphthol AS-IRG (slurry).

Finishing Step 12 parts of calcium chloride, dihydrate is dissolved in 50 parts of water and added to the coupled reaction mixture with stirring and 15 parts of styrene acrylic acid resin (Joncryl 67 available from Johnson Wax, Ravine, Wis. 53403) dissolved in 6 parts of 50% sodium hydroxide solution and 100 parts of water is added over 10 minutes. The mixture is heated to 85° C. and held for 15 minutes with stirring. The mixture is cooled, filtered and the pigment was washed with water, dried and ground. The pigment was tested in water flexo ink and solvent based on coated stock against a control. The test results follow.

| Test | Water Flexo Ink | | Solvent Ink | |
|---|---|---|---|---|
| | Foil | Stock | Foil | Stock |
| Transparency | 4+ | 4+ | 5+ | 5+ |
| Gloss | — | 1+ | 2+ | 2+ |
| Strength | — | 110% | — | 115% |

EXAMPLE 8

Cl Pigment Yellow 74

Cl Pigment Yellow 74 was prepared by slurrying 84 parts of 2-methoxy-4-nitroaniline in 180 parts of water and 151 parts of hydrochloric acid (31%). The mixture was cooled to 0° to −5° C. with ice. Then 86 parts of sodium nitrite, 40% aqueous solution is added subsurface. A strong, positive nitrite test and a temperature of less than 10° C. were maintained for 1.0 hour. The nitrite is then destroyed by the addition of sulfamic acid, the reaction mixture is clarified by filtering and then 2.9 parts of a nonionic surfactant is added. The volume was then adjusted to 1200 parts with water and the temperature adjusted to 10° C.

A solution of 108.4 parts of acetoacet-o-anisidide in 500 parts of water containing 1.1 parts of an alkyl sulfonate and 67.4 parts of sodium hydroxide solution (50%) is made. This solution is filtered and 57.7 parts of acetic acid is added. A solution of 20 parts of styrene acrylic resin (Joncryl 67), 8.0 parts of 50% sodium hydroxide solution and 250 parts of water are added over a 10 minute period.

The diazotized 2-methoxy-4-nitroaniline was added subsurface to the coupler slurry at a pH of 4 over a 90 minute period at room temperature.

Finishing Step

The coupled reaction mixture was finished in two portions.

Finish 1

The portion of the coupled reaction mixture was heated to 80° C. under agitation and held at that temperature for 1 hour. The mixture was then cooled, filtered, washed and dried.

Finish 2

A second portion of the coupled reaction mixture was adjusted to a pH between 8 and 9 with 110 parts of 15% sodium hydroxide solution and heated to 40° C. under stirring. The mixture was held at this temperature for 30 minutes and then 8 parts of calcium chloride dihydrate dissolved in 100 parts of water was added over 10 minutes. The mixture was stirred for 30 minutes and heated to 80° C. The mixture was held at 80° C. with stirring for 1 hour and then cooled, filtered, washed and dried.

The products from both Finish 1 and Finish 2 were tested in water flexo ink and solvent ink systems on coated stock and compared against a commercial standard yellow 74 pigment. The rest results follow.

| Test | Water Flexo Ink | Solvent Ink |
|---|---|---|
| Finish 1 - Test Results | | |
| Transparency | 4− | 3− |
| Gloss | 1+ | 4− |
| Strength | 100% | 83% |
| Finish 2 - Test Results | | |
| Transparency | 3+ | 2+ |
| Gloss | 4+ | 3− |
| Strength | 111% | 104% |

EXAMPLE 9

Cl Pigment Yellow 14

Cl Pigment Yellow 14 was prepared by slurrying 25.3 parts of 3,3'-dichlorobenzidine in 188 parts of water and 34 parts of hydrochloric acid (31%). The mixture was cooled to 0° to −5° C. with ice. Then 33.8 parts of sodium nitrite, 40% aqueous solution are added subsurface rapidly. A strong, positive nitrite test and a temperature of less than 10° C. are maintained for 1.0 hour. The nitrite is then destroyed by the addition of sulfamic acid, the reaction mixture is clarified by filtering and then 2.9 parts of a nonionic surfactant is added. The volume was then adjusted to 435 parts with water.

A second solution of 40.9 parts of acetoacet-o-toluidide in 395 parts of water containing and 35.4 parts of sodium hydroxide solution (50%) is made. The mixture is stirred to dissolve the coupler and the temperature is adjusted to 10° C. with ice. The volume of the solution is adjusted to 550 parts with water and 1.63 parts of an anionic surfactant dissolved in 10 parts of water is added to this solution then 2.4 parts of a second nonionic surfactant dissolved in 10 parts of water is added, then 12.5 parts of glacial acetic acid is added rapidly under stirring. Hydrochloric acid (31%) in an amount of 21.6 parts is added over a three minute period to a pH of 5.5 to 5.7. The pH is then adjusted to 4 with hydrochloric acid and the temperature adjusted to 18° to 20° C.

The diazotized 3,3'-dichlorobenzidine was added subsurface to the AAOT coupler slurry over a 2.0 to 2.5 hour period.

13.2 parts of styrene acrylic acid resin (Joncryl 67) dissolved in 75 parts of water and 6.6 parts of 50% sodium hydroxide are added to the coupled reaction mixture over a 10 minute period and the temperature was increased to 95° C. and maintained at that temperature for 45 minutes with stirring.

The mixture was then cooled, filtered, and washed with water, dried and ground.

The pigment was tested in both water and water flexo ink and solvent ink system against a control batch made without the nonionic surfactant or the Joncryl 67 resin. The test results are as follows.

| | Water Flexo Ink | | Solvent Ink | |
|---|---|---|---|---|
| Test | Foil | Stock | Foil | Stock |
| Transparency | 1+ | 2− | 3− | 5− |
| Gloss | — | 2+ | — | 3+ |
| Strength | — | 105% | — | 100% |

EXAMPLE 10

Cl Pigment Yellow 14

A Cl Pigment Yellow 14 was prepared substantially in accordance with Example 9 except the finishing step was modified as follows.

13.2 parts of styrene acrylic acid resin (Joncryl 67) dissolved in 75 parts of water and 6.6 parts of 50% sodium hydroxide are added to the coupled reaction mixture over a 10 minute period at a temperature of 40° C. Then 8.0 parts of calcium chloride dihydrate dissolved in 50 parts of water was added to the mixture over a 10 minute period with stirring. The mixture was stirred for an additional 20 minutes and heated to 95° C. and held for 45 minutes with stirring.

The mixture was then cooled, filtered, and washed with water, dried and ground.

The pigment was tested in both water and water flexo ink and solvent ink system against the same control batch as in Example 9, made without the nonionic surfactant or the Joncryl 67 resin. The test results are as follows.

| | Water Flexo Ink | | Solvent Ink | |
|---|---|---|---|---|
| Test | Foil | Stock | Foil | Stock |
| Transparency | 5+ | 2− | 2+ | 3+ |
| Gloss | — | 3+ | — | 3+ |
| Strength | — | 133% | — | 111% |

I claim:

1. An azo pigment composition comprising an azo pigment selected from the group consisting of the monoazo and disazo pigments and a water-insoluble, metal salt of a water soluble polymer wherein said polymer in its water soluble form has sufficient acid group substitution to render said polymer soluble in water or aqueous base.

2. An azo pigment composition according to claim 1 wherein said water insoluble metal salt is selected from the group consisting of the calcium and strontium salts of said water soluble polymer and mixtures thereof.

3. An azo pigment composition according to claim 1 wherein said polymer is selected from the group consisting of the polymers and copolymers of acrylic acid, methacrylic acid maleic acid and mixtures thereof.

4. An azo pigment composition according to claim 1 wherein said polymer is selected from the group consisting of the copolymers of acrylic acid, methacrylic acid, maleic acid and mixtures thereof with one or more ethylenically unsaturated, copolymerizable monomer.

5. An azo pigment composition according to claim 1 wherein said polymer is an acrylic acid polymer.

6. An azo pigment composition according to claim 1 wherein said polymer is a styrene/acrylic acid copolymer.

7. A method of forming a dispersion of an azo pigment and a water insoluble salt of an organic polymer having acid group substituents which comprises:
   (a) forming a dispersion of an azo pigment selected from the mono and disazo pigments in an aqueous solution of a water soluble or aqueous base soluble polymer having acid group substituents; and
   (b) adding a metal selected from the group consisting of Group IIA, IIIA and IIIB of the Periodic Table and Mn to the dispersion of Step (a); wherein said metal is added in an amount effective to form the water insoluble salt of said polymer.

8. The method of claim 7 wherein said metal is selected from the group consisting of calcium or strontium and mixtures thereof.

9. The method of claim 7 wherein said water soluble polymer is selected from the group consisting of the polymers and copolymers of acrylic acid, methacrylic acid, maleic acid and mixtures thereof.

10. The method of claim 7 wherein said polymer is selected from the group consisting of the copolymers of acrylic acid, methacrylic acid and maleic acid and mixtures thereof with one or more ethylenically unsaturated copolymerizable monomer.

11. The method of claim 10 wherein said polymer is a styrene/acrylic acid copolymer.

12. The method of claim 7 wherein said polymer is an acrylic acid polymer.

13. A water based ink composition comprising an aqueous binder solution and an azo pigment composition according to claim 1.

14. A water soluble ink composition comprising an aqueous binder solution and an azo pigment composition according to claim 2.

15. A water soluble ink composition comprising an aqueous binder solution and an azo pigment composition according to claim 3.

16. A water soluble ink composition comprising an aqueous binder solution and an azo pigment composition according to claim 4.

17. A water soluble ink composition comprising an aqueous binder solution and an azo pigment composition according to claim 5.

18. A water soluble ink composition comprising an aqueous binder solution and an azo pigment composition according to claim 6.

19. A solvent based ink composition comprising an organic solvent binder solution and an azo pigment composition according to claim 1.

20. A solvent based ink composition comprising an organic solvent binder solution and an azo pigment composition according to claim 2.

21. A solvent based ink composition comprising an organic solvent binder solution and an azo pigment composition according to claim 3.

22. A solvent based ink composition comprising an organic solvent binder solution and an azo pigment composition according to claim 4.

23. A solvent based ink composition comprising an organic solvent binder solution and an azo pigment composition according to claim 5.

24. A solvent based ink composition comprising an organic solvent binder solution and an azo pigment composition according to claim 6.

* * * * *